US008311660B2

(12) United States Patent
Weedlun et al.

(10) Patent No.: US 8,311,660 B2
(45) Date of Patent: Nov. 13, 2012

(54) PRINTED APPLIQUÉ WITH THREE-DIMENSIONAL EMBROIDERED APPEARANCE

(76) Inventors: Paul Weedlun, Ellicott City, MD (US); Susan Ganz, Owings Mills, MD (US); David Litteral, Spring Grove, PA (US); Annamarie Damron, Baltimore, MD (US)

( * ) Notice: Subject to any disclaimer, the term of this patent is extended or adjusted under 35 U.S.C. 154(b) by 580 days.

(21) Appl. No.: 12/387,568

(22) Filed: May 4, 2009

(65) Prior Publication Data

US 2009/0286039 A1 Nov. 19, 2009

Related U.S. Application Data

(60) Provisional application No. 61/126,280, filed on May 2, 2008.

(51) Int. Cl.
*G06F 19/00* (2011.01)

(52) U.S. Cl. ........................................ 700/133; 700/131

(58) Field of Classification Search .......... 700/130–133, 700/136–138
See application file for complete search history.

(56) References Cited

U.S. PATENT DOCUMENTS

| | | | | |
|---|---|---|---|---|
| 5,839,380 | A * | 11/1998 | Muto | 700/138 |
| 6,356,648 | B1 * | 3/2002 | Taguchi | 700/138 |
| 2005/0182508 | A1 * | 8/2005 | Niimi et al. | 700/138 |
| 2007/0118245 | A1 * | 5/2007 | Goldman et al. | 700/138 |
| 2008/0243298 | A1 * | 10/2008 | Hurd et al. | 700/138 |

* cited by examiner

*Primary Examiner* — Nathan Durham

(74) *Attorney, Agent, or Firm* — Ober, Kaler, Grimes & Shriver; Royal W. Craig

(57) ABSTRACT

An appliqué emblem having a three dimensional embroidered appearance for decoration and identification when applied to uniforms, fashion, "basic" and performance apparel, swimwear, and intimate apparel, as well as other textile products. The appliqué emblem being an alternative to direct embroidery, embroidered emblems, thermo-transfer films, silk screen or sublimated printing.

11 Claims, 10 Drawing Sheets

PRINTED APPLIQUÉ WITH THREE-DIMENSIONAL EMBROIDERED APPEARANCE

CROSS-REFERENCE TO RELATED APPLICATIONS

The present application derives priority from U.S. Provisional Patent Application Ser. No. 61/126,280 filed May 2, 2008, which derives priority from PCT Application No. PCT/US2007/005335 filed Mar. 1, 2007.

BACKGROUND OF THE INVENTION

1. Field of the Invention

The present invention relates to appliqué emblems having digitally-printed detailing such as text, logo graphics, numbers, or other indicia that portray a three-dimensional finely-embroidered appearance. The appliqué emblems are applied by thermal activated or pressure sensitive adhesives, or by sewing directly onto garments, apparel, and accessories, thereby eliminating the need for sewn embroidery.

2. Description of the Background

Fashion, "basic" and performance apparel, uniform, swimwear, intimate apparel, outerwear and accessory manufacturers use various methods to apply decoration and identification to garments and textiles. They tend to use silk-screening, screen-printing, thermo-transfer films, sonic welding, and direct embroidery as their primary methods for decorating and identification.

Silk-screening of logos or emblems is commonly used, but this process is complex and time-consuming. In addition, the designs created by silk-screening are flat, lack texture, and do not withstand repeated industrial or home washings. Consequently, many companies prefer embroidery as their primary method for applying decoration and identification.

Sonic welding is another method used to apply decoration and identification to garments and textiles. This process requires the creation of unique, expensive special dies for any design to be applied. The quick-change requirements associated with the fashion industry make this process slow and relatively expensive. Sonic welding allows texturing, but also requires chemical compounds that some companies find unacceptable, and that can result in a product that does not withstand repeated home and industrial laundering. Thus, this process typically is not used by the uniform industry for these reasons.

Despite the foregoing alternatives, embroidery has become the predominant method for applying decoration and identification. Traditionally, embroidery is performed by a machine that applies stitching of various colors and styles to fabric to create a design. Embroidered designs have a much greater aesthetic value, but require a complex and time-consuming process. A separate stitching step is required for each color in the design and for each design element.

U.S. Pat. No. 5,009,943 to Stahl discloses a method for producing a multi-colored emblem that may be ironed-on to garments to provide an embroidered appearance. This method entails laminating a material blank, cutting the laminated material to a specific design, embroidering about the periphery of the cut design, laminating the assembly onto a second material blank, and coating the underside with a thermal adhesive layer. The emblem can then be heat-sealed to a garment.

There are other transfer emblems that may be applied to various cloth surfaces without embroidery. For example, U.S. Pat. No. 5,635,001 to Mahn, Jr. issued Jun. 3, 1997, shows cloth transfers that include a cloth layer coated with a plastic layer which is, in turn, coated with a pressure sensitive adhesive layer.

U.S. Pat. No. 5,914,176 to Myers issued Jun. 22, 1999, shows a composite design for attachment to another fabric article, comprising an underlying layer of twill fabric on one side of which a design is screen printed with plastisol based inks and heat cured. The twill is cut into a desired shape so that the twill and the ink portion form the composite design. Methods of making and attaching the composite design are disclosed.

Though stitched embroidery is avoided, in both of the foregoing cases, the ink designs are screen printed and die cut. These are independent steps creating a cumbersome process. The resulting product is inferior in durability to washing and cannot be ironed. Further the preferred embodiment uses plastisols in the inks, which are objectionable to many apparel manufacturers. More recent technological advances have been made in the field of digital printing and advanced cutting to reduce the cost, development cycle time, product cycle time, and required inventories.

Multi-color electrostatic printing techniques are described in U.S. Pat. Nos. 5,899,604 to Clark; U.S. Pat. No. 4,181,423 to Pressman et al.; and U.S. Pat. No. 5,749,032 to Landa et al. Manufacturers of electrostatic printers include RasterGraphics (Orchard Parkway, San Jose, Calif.) and 3M (St. Paul, Minn.), all of whom have introduced 54 inch wide printers with multiple inking fountains for displays, signs and banners, trade show graphics, outdoor billboards, fleet graphics, bus shelters, wall paper, vinyl flooring, and backlit displays, etc. Dye sublimation has dramatically increased the applications for electrostatic printing. By imaging first on electrostatic paper and then applying heat, pressure and time, color images can be transferred onto a wide variety of other substrates, including, but not limited to a wide variety of polyester fabrics. Thermal Inkjets are a new print format that are capable of economical high-quality production-speed fabric printing. For example, the Colorfast™ Fabrijet™ Thermal Inkjet is capable of 600 dpi or 1200 dpi using 12 printing heads that deposit a reactive, acid CMYK ink. Similarly, Stork Digital Imaging has introduced its Sapphire II™ digital printer for high-quality sampling and production runs on textile and apparel. This system is capable of printing on a wide variety of natural and synthetic textiles including silk and polyamide, as well as stretch fabrics. The DuPont™ Artistri™ is a fully integrated, production capable digital printing system developed for printing on all type of fabrics including cellulosic, polyamides, and polyesters. The system was designed for a variety of applications, including printed textiles, accessories, apparel, home furnishings, gaming table covers, flags, banners, soft signage, and trade show displays. This thermal inkjet printer is also equipped with an on-board heating unit that is designed to cure the inks onto the fabrics before they exit the roll-to-roll printer. The final setting of the inks on polyesters can occur on a heated calendar.

Despite these print hardware and transfer advances, there are no current production methods for producing multi-colored printed appliqué emblems that exhibit an accurate three-dimensional embroidered appearance. This is due to difficulties in image manipulation and rendering. Currently, "cleaning up" existing low-res jpeg/tiff/bmp images (100-300 dpi) for embroidery is a cumbersome task, entailing importing into vector format using a program such as CorelDraw™ and then manually touching up. Conventional graphics programs manipulate either bitmaps or vector-based drawings. Vector-based drawings have the advantage of being scalable without loss of detail. Scaling bitmapped graphics can result in visible defects, such as aliasing. Bitmapped images also tend to have large file sizes, and are difficult to edit to change text, line placement, etc. Vector-based drawings are thus commonly preferred for images that need to be revised. However, printing or displaying a vector-based drawing generally requires that a bitmap rendering be performed at some time, since most printers and display monitors are raster-scanned bitmap devices.

There are a variety of well-known conversion solutions for converting digital images into embroidery data (sequences of x, y values representing the horizontal and vertical location of each needle penetration and subsequently the end point locations for stitches). For example, the Wilcom ES65™ software has the ability to convert vectors to stitches. However, there are far fewer attempts at converting low-resolution embroidery output files, or scanned images into vector format for touching up, and then into high-resolution (300 dpi or higher) raster formats suitable for printing with a digital printer, or for display and printing 3D embroidered-appearance transfers.

One example is U.S. Pat. No. 5,668,730, which describes a system that allows a pattern to be scanned into a computer, and image characteristics of the scanned image are recognized. This is similar to tracing a bitmap image in CorelDraw to achieve a vector format, albeit the patent automates the process. Beyond this, manual manipulation of the image is required for accuracy.

The Wilcom TrueSizer™ application touts universal file conversion capabilities between numerous file formats, and designs can be scaled and printed for production worksheets, presentations, and sales printouts. It is not clear whether TrueSizer can convert low-res images into high-resolution (such as 720 dpi) 3D formats suitable for printing with a digital printer, or for display and printing 3D embroidered-appearance transfers.

Regardless, the image/resolution conversion process significantly detracts from the realism of the finally-printed image because fine three-dimensional embroidery details are lost.

It would be greatly advantageous to provide process for producing an appliqué transfer emblem bearing various combinations of digitally-printed embroidery elements such as letters, logo graphics, numbers, or other indicia that portrays a three-dimensional finely-embroidered appearance.

SUMMARY OF THE INVENTION

It is, therefore, the primary object of the present invention to provide a novel appliqué emblem bearing text, numbers, logos, and other indicia for the uniform and other industries that serves as a replacement for embroidery, thermo-transfer films, or lower resolution silk screening. The appliqué emblem gives a three-dimensional monogrammed appearance.

It is another object to provide digitally printed appliqué emblem having text, numbers, logos, and other indicia that is capable of being heat or pressured sealed, or sewn to, a garment or other article that, when so secured, creates a new form of decoration that appears to be an embroidered part of the garment.

According to the present invention, the above-described and other objects are accomplished by a product and process for applying digitally printed appliqué emblem that is capable of being adhered to a garment or other article by a pressure sensitive or thermal activated adhesive or by sewing down the perimeter and, when so secured, gives the appearance of a three-dimensional multicolored embroidered design that can simulate stitched designs or layered textile embellishment.

Generally, the production process for digitally printed appliqué emblems as described above begins as an appliqué design that is imaged or drawn, and converted from low-resolution raster format or embroidery format to a vector format. It is then manually manipulated using a software toolset pursuant to specific process steps to add three-dimensional aesthetic elements such as stitch-on-stitch, kiss-cuts, and stitch shading. The edited image is then upconverted to at least 300 dpi raster format, and preferably 720 dpi or more for digital display and/or printing to more accurately reflect a three-dimensional finely-embroidered appearance.

More specifically, the production process for digitally printed appliqué emblems as described above begins with (1) a design phase by which a distinct image file is digitally created using raster imaging software for a newly generated design, or is derived from a pre-established design by digital scanning or photographing; followed by (2) a vectorization phase for conversion of the raster file format to a vector representation; (3) an interpolation-to-embroidery phase in which pre-defined raster embroidery elements are mapped to the vector image; (4) a raster editing phase for establishing embroidery characteristics such as line thickness, direction, spacing (or density), and shading; for manually touching up the image; and for saving the vector image as a raster format having a resolution of at least 300 dpi. During an optional Raster Touch-up Phase (5) the image is further aesthetically edited using a raster graphics program—characteristics such as saturation or contrast can be adjusted. Following either the raster editing phase or the raster touch-up phase is a printing phase (6), in which the appliqué design in raster format is then transmitted to a digital printer that translates the pixel color values to obtain the optimal color match for driving the digital printer based on its ink dye set. The digital printer then precisely applies the ink droplets to a fabric substrate and thermosets the ink, along with possible post treatment to improve fastness properties. Alternatively, the appliqué design is printed on thermal transfer paper that is then sublimated onto the fabric substrate. Finally, there is a coating/laminating phase (7) in which the printed fabric substrate is coated with a thermoplastic or pressure sensitive adhesive on its backside for later heat-sealing, pressure sealing. Alternatively, the coating laminating phase is omitted and the printed fabric substrate is sewn to the desired a garment.

The foregoing process results in an appliqué emblem bearing a combination of digitally-printed elements such as letters, logo graphics, numbers, or other indicia that have a simulated three-dimensional embroidery-stitched appearance in a form that can be digitally printed and easily heat-sealed, pressure-sealed, or sewn to a garment or other textile.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is an adhesive appliqué emblem having realistically-portrayed embroidered-appearing text, numbers, logos, and other indicia for the uniform and other industries, as well as the novel process for efficiently producing it in mass production using digital printing, and etching and cutting techniques. The appliqué emblem includes a multi-color printed design appearance with or without simulated or textured embroidery stitching, and may be heat or pressure sealed, or sewn to, an article of clothing or clothing accessory. In each case, the appliqué emblem is well-suited for application to any fabric or leather substrate, including coarser non-woven fabrics such as felt and fleece ("non-woven being herein defined as any fabric substrate produced by processes other than weaving).

Figure 1:
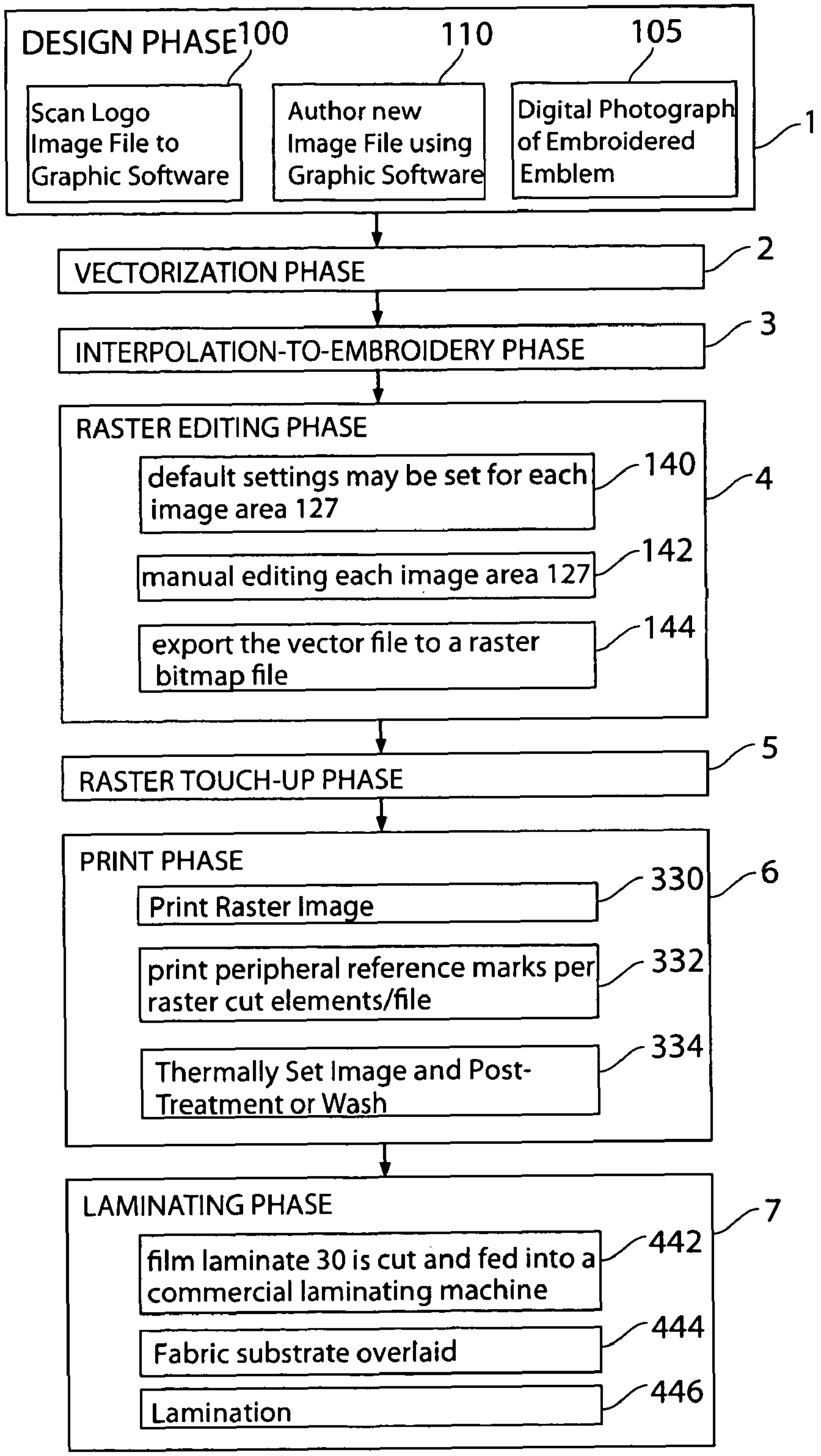
FIG. 1 is a block diagram of the method steps and substeps involved in producing and applying the 3D embroidered emblem.

FIG. 1 is a block diagram of the method steps and substeps involved in producing and applying the appliqué emblem having a three-dimensional embroidered appearance.

The production process for the digitally printed appliqué emblem as described above begins with a design phase 1 in which a raster image file is digitally created using raster imaging software for a newly generated design, or by scanning or photographing for a pre-existing design. This phase is followed by a vectorization phase 2 for conversion of the raster file format to a vector representation; an interpolation-to-embroidery phase 3 in which pre-defined raster embroidery elements are mapped to the vector image; a raster editing phase 4 for establishing embroidery characteristics such as line thickness, direction, spacing (or density), and shading, and for manually touching up the image. During this phase, the image is converted to raster format having a high resolution. During an optional raster touch-up phase (5), the converted raster image is further aesthetically edited using a raster imaging program. Phase 4 or 5 is followed by a print phase (6) in which the raster appliqué design is then inputted into a digital printer that translates the pixel color values to obtain the optimal color match for driving the digital printer based on its ink dye. The digital printer then precisely applies the ink droplets to a fabric substrate and thermally sets the ink, along with possible post treatment to improve fastness properties. Alternatively, the image may be printed onto sublimation paper and then thermally transferred onto the fabric substrate. Finally, in the preferred embodiment there is a coating/laminating phase (7) in which the printed substrate is coated with a thermoplastic or pressure sensitive adhesive on its backside for later heat-sealing, pressure sealing, or sewing to a garment.

The above-described process results in an appliqué emblem bearing a combination of digitally-printed elements such as letters, logo graphics, numbers, or other indicia that include a simulated three-dimensional embroidery-stitched appearance in a form that is easily heat or pressure sealed or sewn to a garment or other textile. Each step of the process is described in detail.

Step 1: Design Phase

Figure 2:
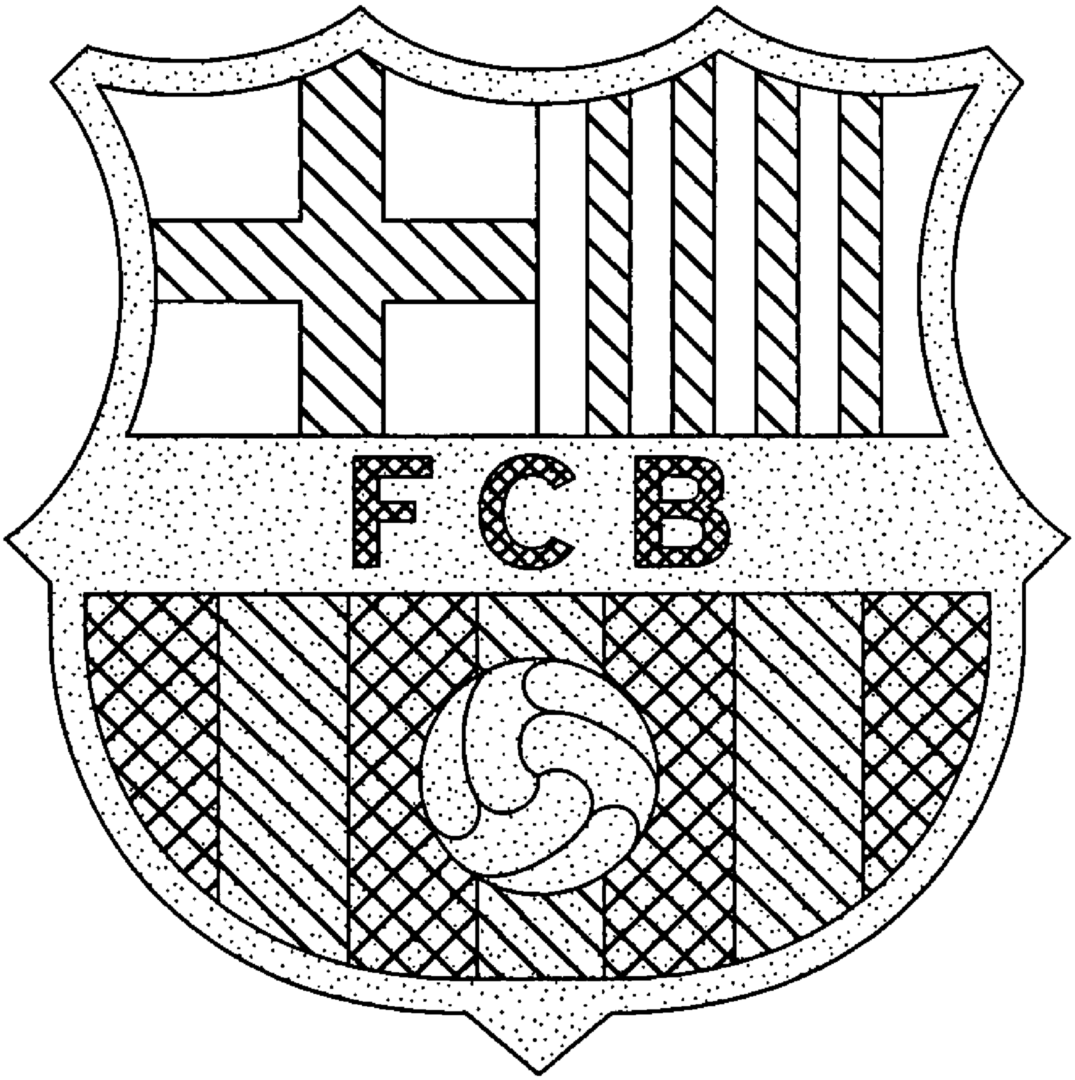
FIG. 2 is a screen print of an appliqué graphic design in a raster file format.

The first step is that of creating an emblem graphic design. With embroidery, designs can be derived from existing logos by scanning or photographing the logo into a raster file format, such as RGB color image data composed of eight bits for each of the colors R, G, and B, as seen at substep 100, or from digitally photographing an existing design in a raster format, such JPEG or other compressed raster format, as illustrated in substep 105. Alternatively, as seen at step 110, the designs may be designed from scratch using a computerized design process, which entails generating the text, numbers, and graphics for the emblem design by using computer software. Such graphics programs include the well-known Adobe Illustrator™ or CorelDrawr™. FIG. 2 is a screen print of an emblem graphic design in a raster file format using RGB color image data composed of eight bits for each of the colors R, G, and B as derived above in substeps 100, 105, or 110.

Step 2: Vectorization Phase

Figure 3:
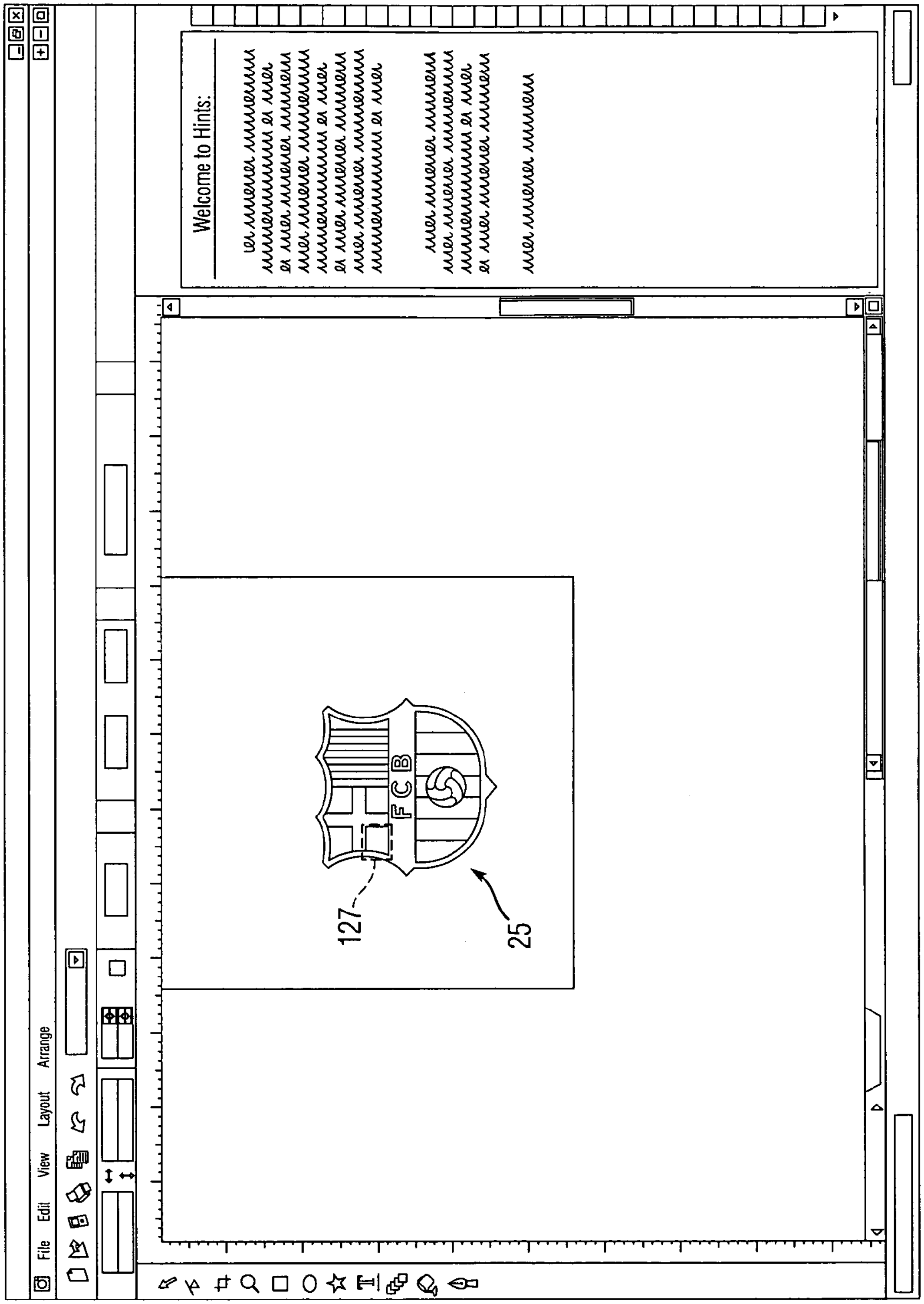
FIG. 3 is a screen print of the appliqué graphic design converted to a vector format.

Assuming a raster file format using RGB color image data composed of eight bits for each of the colors R, G, and B as derived above in substeps 100, 105, or 110, the next step is to convert the raster file format to a vector representation in Vectorization Phase 2. In a raster representation, a bitmap specifies a set of pixel values at a set of raster positions to define an image. To convert a bitmap to vector, tracing software is required. Most existing vector illustration software packages include software for tracing bitmaps. For example, CorelDRAW™, Xara™, Freehand™, Flash™, and many other drawing applications all come bundled with autotrace utilities. Alternatively, a user can trace the artwork manually in a vector drawing program. FIG. 3 is a screen print of the emblem graphic design 25 converted to vector format using Corel DecoStudio®(, a hybrid program combining CorelDRAW® Graphics Suite while Wilcom ES. This is accomplished using the File>>Import command. Conversion breaks the appliqué design 25 down into discrete image areas such as, for example, area 127.

Step 3: Interpolation-to-Embroidery Phase

Figure 4:
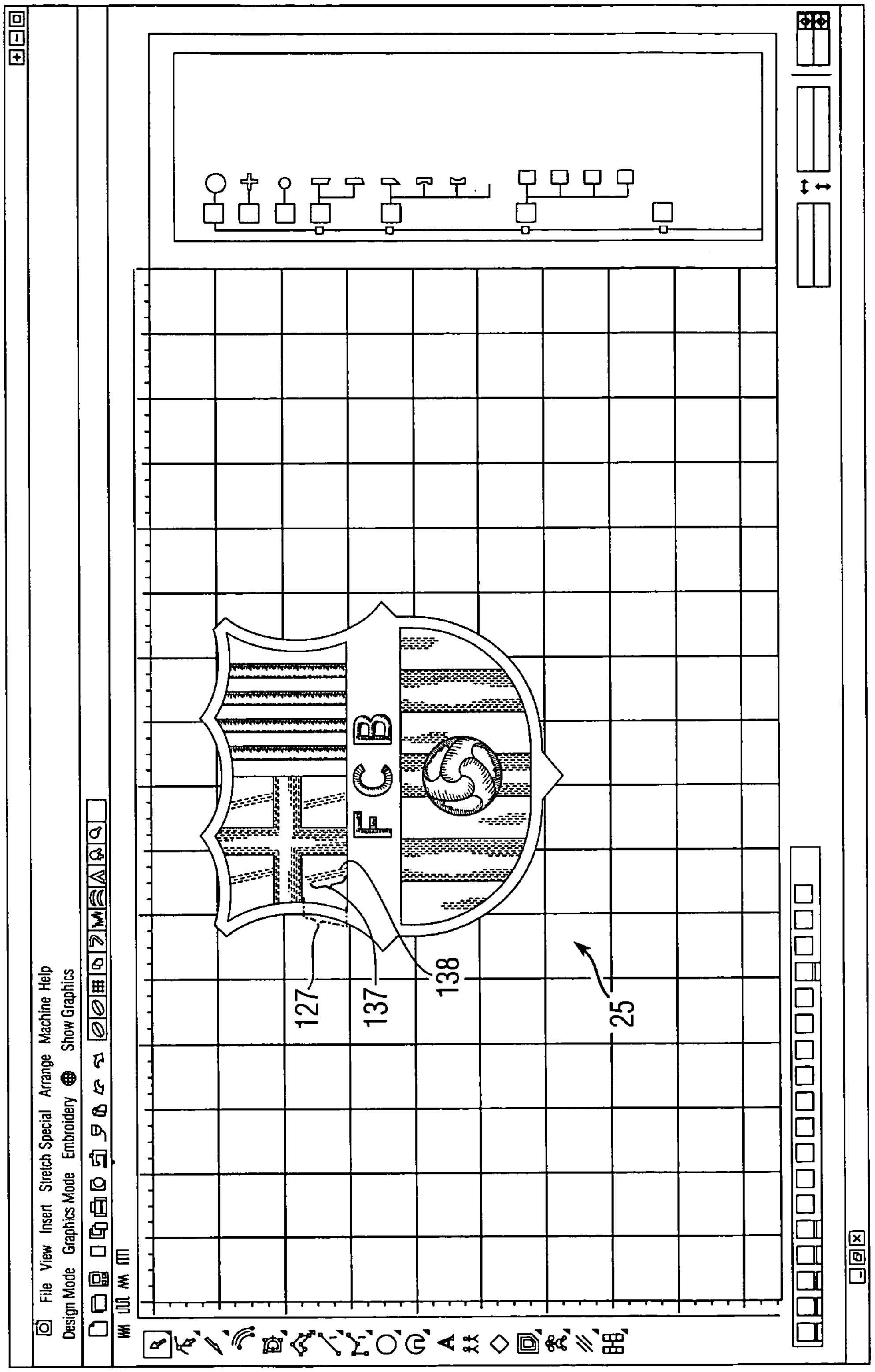
FIG. 4 is a screen print of the appliqué graphic design after mapping the raster embroidery elements.

In the Interpolation-to-Embroidery Phase 3, pre-defined raster embroidery elements are mapped to the vector image for ease of editing. In DecoStudio®, this can be accomplished automatically using a library of predefined embroidery elements. FIG. 4 is a screen print of the emblem graphic design 25 after mapping of the vector embroidery elements. This is accomplished using the Embroidery command. Interpolation maps the predefined embroidery elements to the image areas 127 defined in step 2. Specifically, interpolation applies a stitch pattern to area 127 that is a series of substantially parallel lines 137 of uniform predetermined thickness, direction, spacing (or density), and shading. Moreover, the length of the parallel lines 137 within each image area is limited to a pre-defined range detailed below, to replicate stitching. Thus, in more expansive solid colored image areas such as 127 each line 137 will comprise a series of discrete contiguous line segments 138 traversing the image area.

Step 4: Raster Editing Phase

The rendering completed in the interpolation-to-embroidery phase above is intended for actual stitching in embroidered form, and the interpolated embroidery characteristics are not optimized for digital printing, and in some cases are wrongly assigned. The raster editing phase 4 corrects errors and optimizes the interpolated emblem graphic design for digital printing and displaying and, specifically, creates the three-dimensional effect. As seen in FIG. 1, at step 4, the raster editing phase 4 further comprises the following substeps:

a. Substep 140: Set Defaults—line spacing, orientation, thickness, length, direction, spacing (or density), and shading;

b. Substep 142: Manual Editing—adjust line spacing and set 3D shading; and c. Substep 144—Export design as raster image with high resolution.

Figure 5:
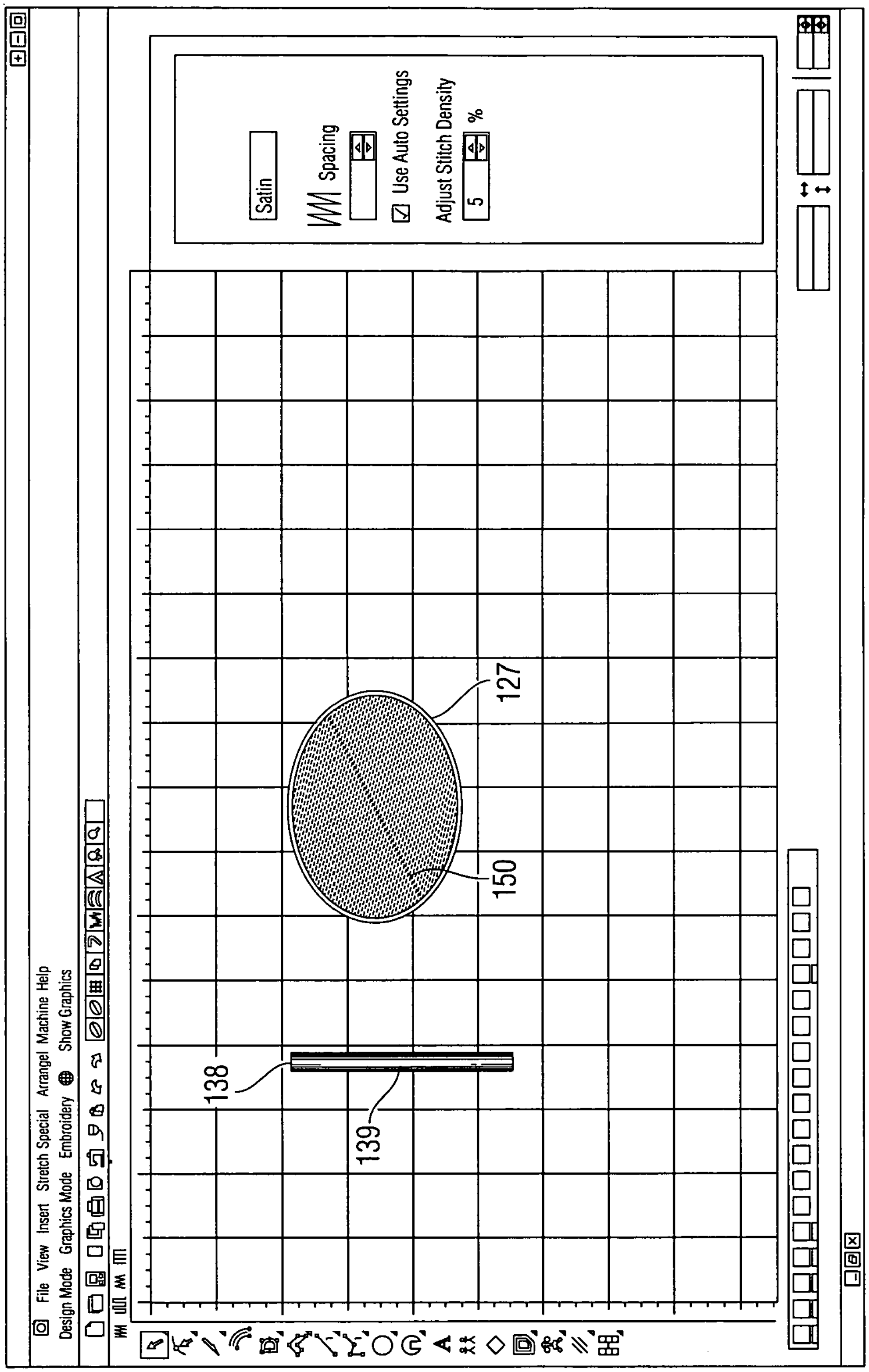
FIG. 5 is a screen print illustrating how the default settings would be set for an exemplary image area.

At substep 140, the user sets the Default Settings including line spacing, orientation, thickness, length, direction, spacing (or density), and shading. The default settings may be set for each image area, for example, demarcated image area 127 created in the vectorization step 2. FIG. 5 is a screen print illustrating how the default settings would be set for an exemplary image area 127 (or "object") using Corel DecoStudio™. The image area 127 is selected and the Show Graphics button is depressed, which opens the right-panel default settings dialogue. Here, as seen in the tabs at top right, the object outline can be defined, stitching pattern, fills, and custom (user defined) default settings may be applied. As illustrated, the stitching tab is selected and this provides options to select a stitch pattern (Satin), set the stitch spacing (or use autospacing), and set stitch density, which will adjust the line width based on spacing. These parameters are set and viewed on-screen until satisfactory.

Next, at substep 142, the user will manually edit the emblem design to adjust individual line spacing or add three-dimensional shading, or visually adjust the image as desired. While any and all attributes may be here adjusted manually to suit the artistic taste of the user, the primary purposes are to correct interpolation artifacts and to add three-dimensional shading. FIG. 5 illustrates an interpolation artifact 150 which is a visible incongruity resulting from an improperly assigned line spacing. In the manual editing mode, the user can simply click-and-drag errant line(s) to achieve uniform spacing. In addition, line shading 139 is added as seen at left to all design elements that would be raised if embroidered, such as outlines, margins, etc. This shading 139 gives the particular element 138 a rounded appearance. Depending on the desired light angle effect, the shading 139 may be printed on one or both sides of each line or element 138. The shading generally comprises a grayscale pattern fading from dark to light running toward the center of each line or element 138.

Figure 6:
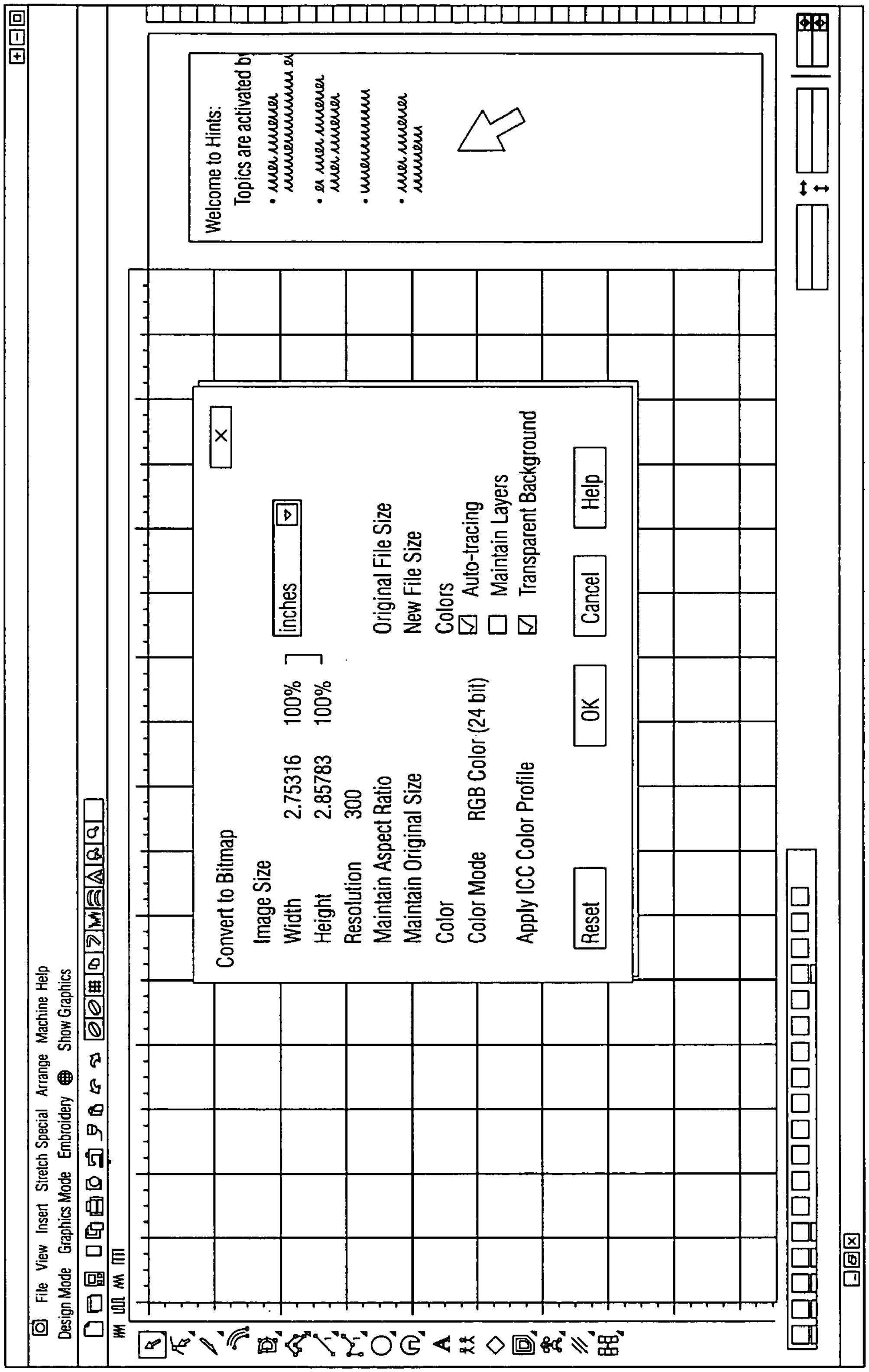
FIG. 6 illustrates the initial export dialogue box in DecoStudio™ that allows user-selection of the graphic size, resolution (dpi), color profile, and aspect ratio as shown.
Figure 7:
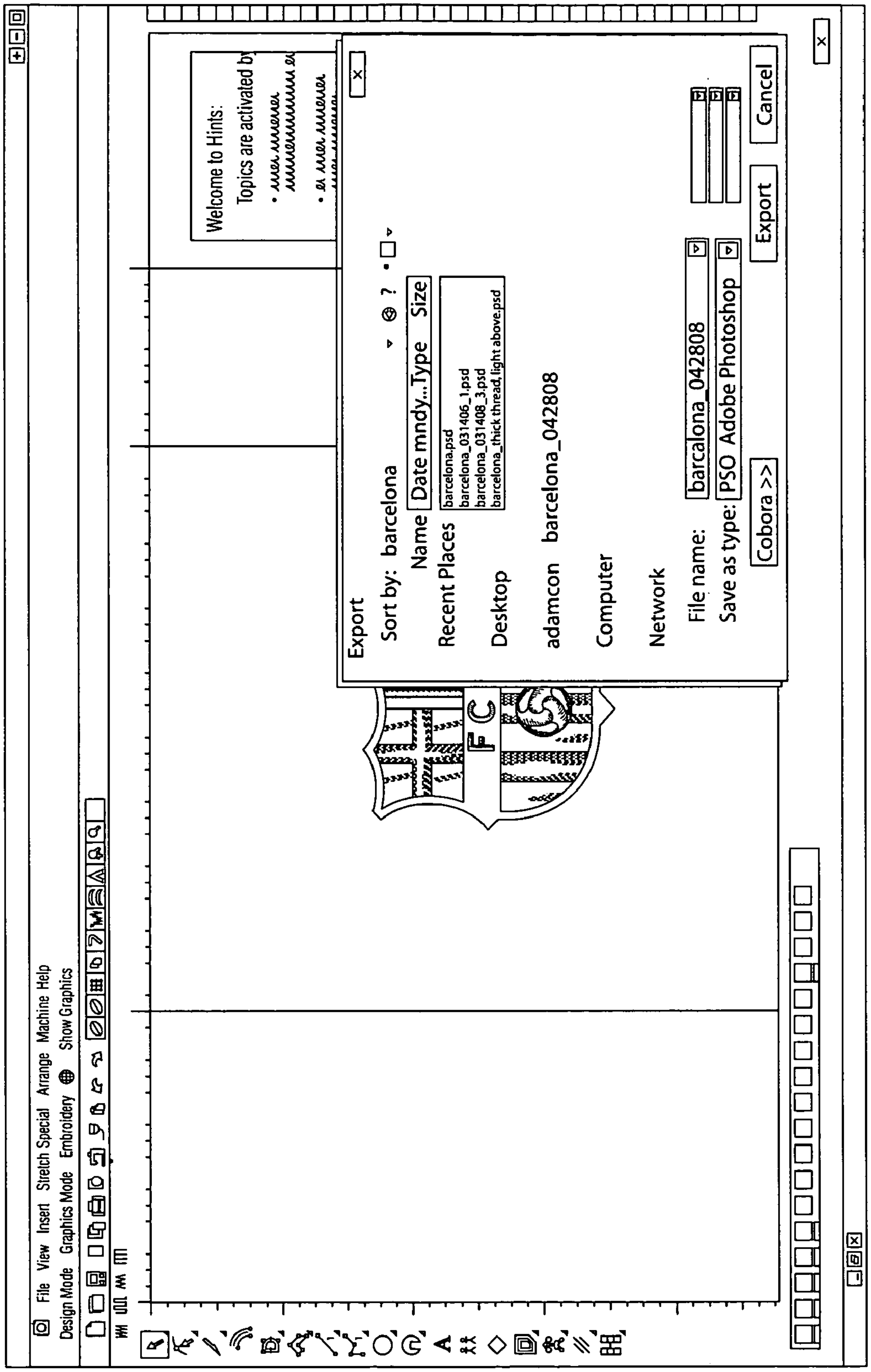
FIG. 7 is a screen print of the secondary export dialogue box that allows user-selection of the export format, file name, and compression settings.

The next substep at 144 is to export the vector file to a raster bitmap file. DecoStudio™ and most other vector drawing programs will have an export function, which can be used subject to two important parameters. FIG. 6 illustrates the initial export dialogue box in DecoStudio™ that allows user-selection of the graphic size, resolution (dpi), color profile, and aspect ratio as shown. At this juncture the user must select the maximum resolution, which is 300 dpi, and a red, green, blue (RGB) export format. With these options selected, a secondary export dialogue box in DecoStudio™ will open. FIG. 7 is a screen print of the secondary export dialogue box that allows user-selection of the export format, file name, and compression settings. Here it is important to select an uncompressed export format as shown at bottom right. For purposes of illustration, the user has here selected to export in Adobe Photoshop™ file format. This will result in an uncompressed PSD file named Barcelona_040248 in 300 dpi, 24 bit RGB bitmap raster format. This filed may be emailed, printed for demonstration, or displayed.

Step 5: Raster Touch-Up Phase

Figure 8:
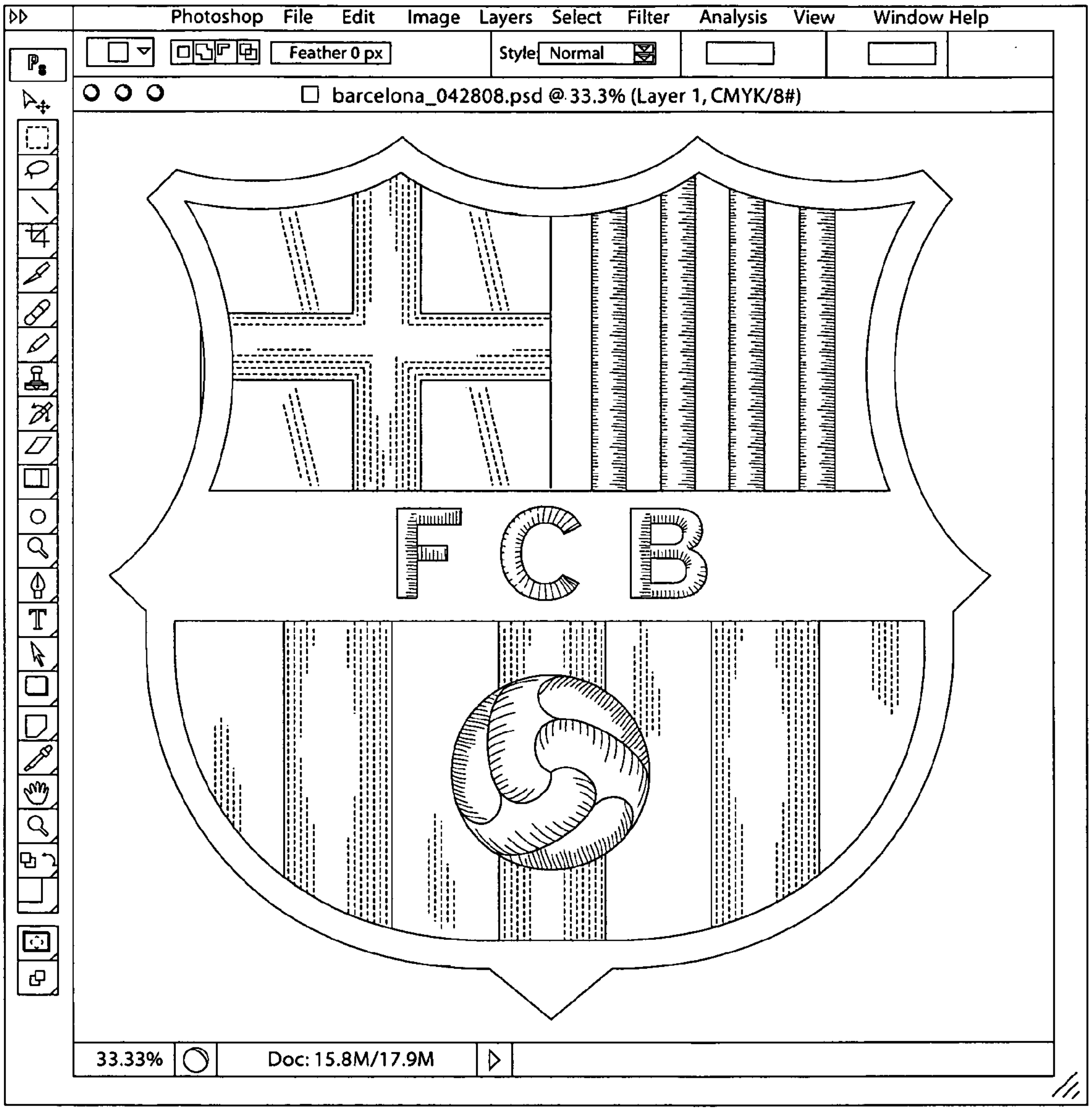
FIG. 8 is a screen print of the open graphic file in Adobe Photoshop™.

At this optional step, the exported raster graphic file is opened in a suitable raster editing program such as Adobe Photoshop™. Upon opening, Adobe Photoshop™ gives the user the option to open the file at any specified resolution up to and including 1020 dpi. Once opened, the user is also free to further edit the raster graphic design and make further edits as desired. FIG. 8 is a screen print of the open graphic file in Adobe Photoshop™. The fine embroidered detail of the emblem graphic is readily visible, and note especially that the digitally-portrayed raised elements such as letters, margins and outlines all bear distinct shading that give a three-dimensional finely-embroidered appearance. This edited, high-resolution 3D embroidered emblem graphic may be emailed, printed for demonstration, and displayed for proofing purposes.

Step 6: Print Phase

After the Raster Editing Phase 4 or the Raster Touch Up Phase 5 (if needed), the appliqué design is printed to a fabric substrate. At substep 330, appliqué design is printed to form a static latent image using a blend of the color primaries in the printers ink set including but not limited to four toner images of different colors, such as using respective yellow (Y), magenta (M), cyan (C) and black (K) toners, so that a multi-color image is formed. In an embodiment, the appliqué design is printed directly to the fabric substrate 20. This embodiment comprises providing fabric substrate 20 in bulk roll form and feeding it in sheet or roll form to a thermal inkjet printer, such as a Colorfast™ Fabrijet™ Thermal Inkjet, Stork Sapphire II™ digital printer, or DuPont™ Artistri™ printer. In another embodiment, the design is printed on sublimation paper (using a sublimation printer such as a Roland Model FP-740) and then thermally applied to the fabric substrate 20.

In addition to printing the raster image design, at substep 332, the inkjet printer may print peripheral reference marks in accordance with the raster cut elements/file for use in subsequent operations to allow optimal referencing system to be used for cutting of the appliqué emblem 10. At substep 334, the image is then fused as the substrate 20 by applying heat with, for example, heated rolls, a heat press with heated platens, or steam, or by curing with ultraviolet light. To improve color fast properties, the printed substrate can go through additional post treatment or washing steps.

Step 7: Laminating Phase

In the preferred embodiment, at step 7, a thermally activated coating is applied to the non-printed side of the fabric substrate. This step begins at substep 442, in which a film laminate 30 is obtained in bulk roll form, cut, and fed into a commercial laminating machine. Other methods for applying the thermoplastic layer may include application in powder or liquid form. At substep 444, the fabric substrate 20 is overlayed for heat sealing thereto, and at substep 446 the lamination is effected.

Flatbed laminating is preferred, and a suitable laminating machine is the Glenro HTH or HTM model flatbed laminator from Glenro Inc., 39 McBride Ave., Paterson, N.J. 07501-1799. These are PLC-controlled machines, and the heat is set according to the glue line (melt) temperature—307 degrees Fahrenheit for the preferred laminate 30. This step 7 melts the laminate 30 into the fabric substrate 20. Lamination of a pressure sensitive adhesive can alternatively be used with application occurring by the use of pressure rolls or platens.

The substrate 20 may then be transferred to a digitally-controlled cutting station, such as a laser cutter or digital die cutter. For example, the cutting and etching station may be an Atlanta FB-1500 Laser Cutting System manufactured by CADCAM Technologies, Inc. of Knottingham, England. The cutting and etching station includes an indexed cutting bed upon which the substrate 20 is placed and having an X-Y plotter with articulating laser head thereon or a rastering laser that directs the laser beam by driving mirrors to direct the beam on the bed. The heat from the laser beam cuts the fabric. The printed substrate 20 is placed on the bed and under cutter and laser head which moves along the bed to cut the substrate 20 about the graphic emblem design.

After cutting, the finished appliqué emblem 10 (inclusive of substrate 20 and laminate 30) is ready for application. The finished emblem may be sealed in a Mylar® or cellophane package for shipping.

Once received and unpackaged, the emblem 10 may be applied by heat sealing, pressure sealing, or sewing. Regarding heat sealing, electrically heated platen presses are the most commonly used means of applying the adhesive coated appliqué emblem 10 to garments or other articles. Temperature, pressure, and dwell time are the three basic seal conditions that must be controlled to ensure a proper bond. These three parameters should be established for each specific garment and embroidery combination. Generally, for the preferred embodiment illustrated above the temperature is held at approximately 307 degrees Fahrenheit (the temperature at which the glue will melt), and this temperature is sustained for 5-10 seconds. Very thick materials will usually require a longer dwell time to allow the greater mass to be heated, and to conduct the heat to the glue line. If pressure sensitive adhesives are utilized, application can be accomplished by applying uniform pressure to the appliqué to adhere it to the garment. Alternatively, the appliqué emblem 10 may be sewn to the garment by stitching the outer periphery of the appliqué emblem 10 to the garment.

The foregoing results in a color-printed and highlighted emblem that gives an aesthetically-pleasing three-dimensional embroidered appearance.

Figure 9:
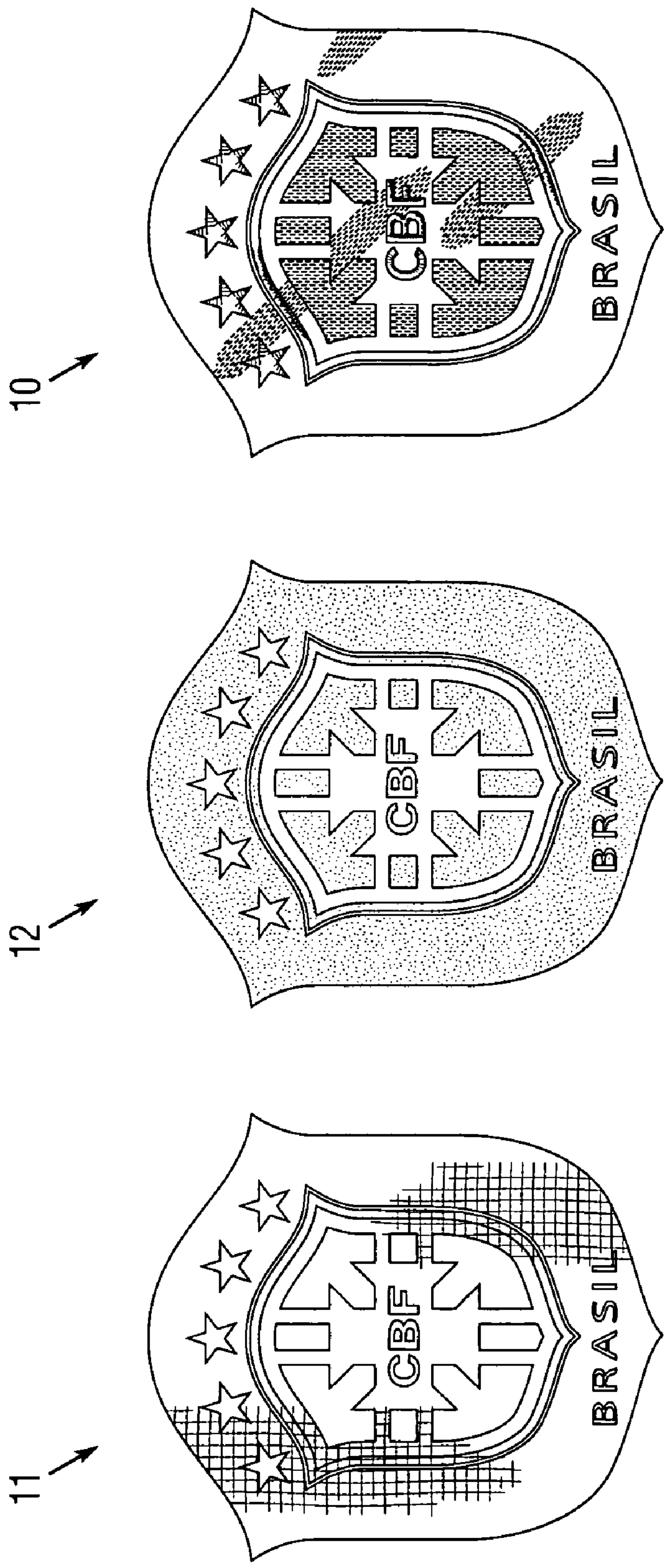
FIG. 9 is a perspective view of three side-by-side appliqué emblems including an original fully-embroidered stitched emblem 11 at left, the same emblem design 12 after having been scanned and printed on a digital printer, and an appliqué emblem 10 after having been processed according to the method of the present invention.

FIG. 9 is a perspective view of three side-by-side emblems including an original fully-embroidered stitched emblem 11 at left, the same emblem design 12 after having been scanned and printed on a digital printer, and an emblem transfer 10 after having been processed according to the method of the present invention. The dramatic improvement in detail and dimensionality is readily apparent.

Figure 10:
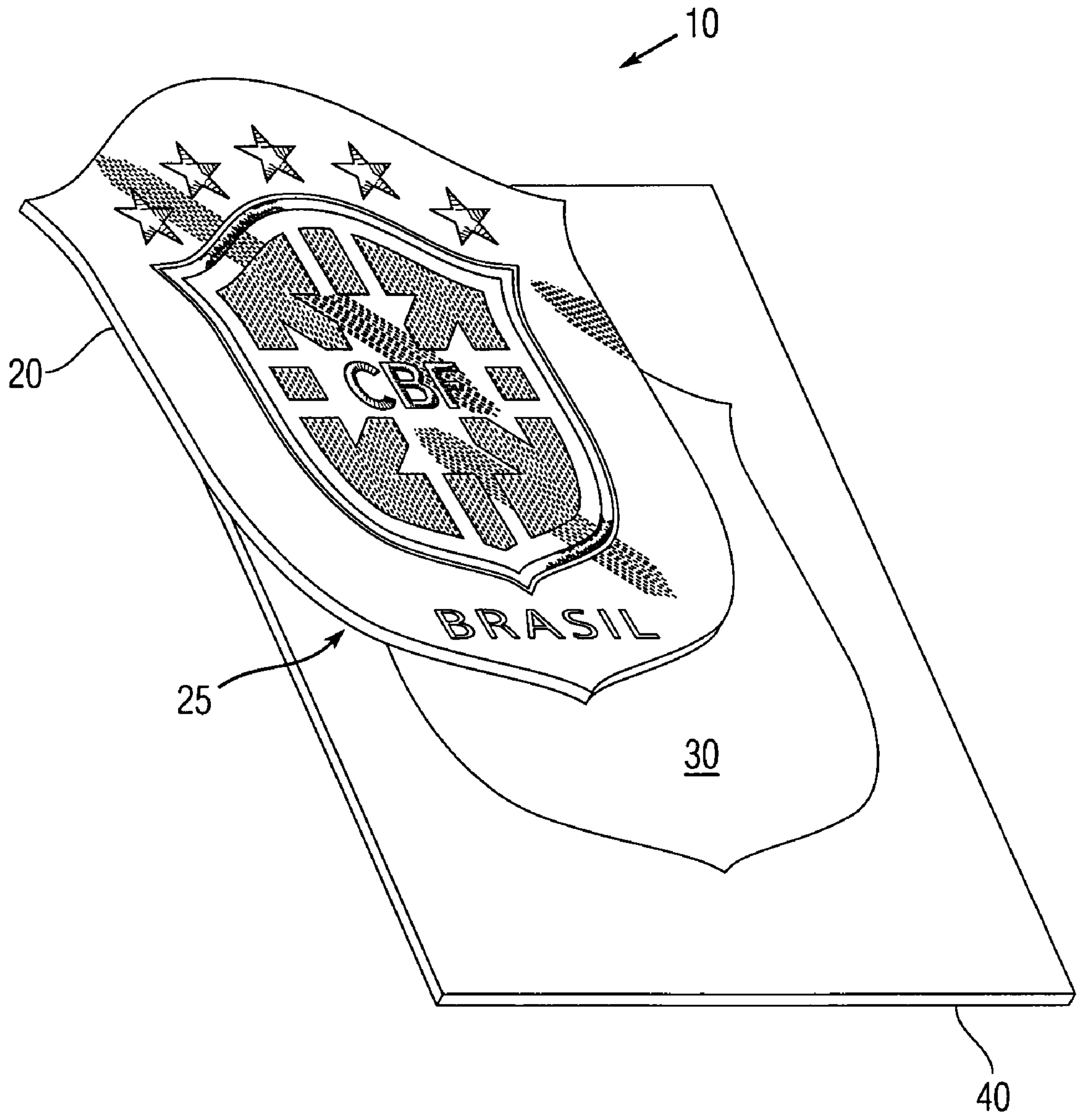
FIG. 10 is an exploded perspective view of the component layers of the appliqué emblem 10 as in FIG. 9.

FIG. 10 is an exploded perspective view of the component layers of the appliqué emblem 10 as in FIG. 9. As seen in FIG. 10, the emblem 10 generally comprises a printed fabric substrate 20. The illustrated fabric substrate 20 may be a polyester twill, although other fabrics are suitable. Twill fabric incorporates a twill pattern identified by characteristic diagonal lines. For example, 2/2 twill has two warp threads up for every two down and is made by passing the weft threads over one warp thread and then under two or more warp threads. However, fabric substrate 20 may also be any non-woven fabric (produced by processes other than weaving) as a matter of design choice, provided that the qualities of fabric substrate are consistent with those of the clothing article to which the appliqué emblem 10 will be application—so that the emblem transfer 10 does not to detract there from. The fabric substrate 20 is printed with the appliqué design 25, and is then cut for application to garments, bags, home furnishing, mats, automotive interiors, etc., by means of mechanical bonding such as, but not limited to, sewing, heat sealing, pressure sealing, or gluing. Referring back to FIG. 5, the appliqué design 25 bears the following characteristics which create a three dimensional representation of an embroidered emblem. The appliqué design 25 comprises one or more image areas 127 each comprising a series of substantially parallel lines 137 of uniform predetermined thickness, direction, spacing (or density), and shading. Moreover, the length of the parallel lines 137 within each image area is limited to a pre-defined range detailed below, to replicate stitching. Thus, in more expansive solid colored image areas 127, each line 137 will comprise a series of discrete contiguous line segments 138 traversing the image area. More specifically, these features are as follows:

Thickness: the line 137 thickness is chosen to approximate the size of sewing threads that it replicates, and will preferably be within a range of about 0.1-0.5 mm (corresponding to 90 denier to 270 denier);

Spacing: the user-defined line spacing (distance between adjacent lines) correlates to stitch density or stitch spacing (distance between adjacent stitch lines) in an embroidered emblem 10. If line spacing is low, there is more space between the stitches than if density is high. In the illustrated embodiment, a line spacing within a range of about 0.1-0.5 mm will suffice;

Shading: Each of the lines 137 has a rounded, three-dimensional appearance created by printed shading 139 on each distinct line segment 138. Depending on the desired light angle effect, the shading 139 may be printed on one or both sides of each line 137. The shading generally comprises a grayscale pattern fading from dark to light running toward the center of each line 137;

Direction: All lines 137 within each image area 127 are substantially parallel, and the lines 137 in different image areas are preferably oriented at different angles to increase contrast; and Segment Length: As stated above, the length of the parallel lines 137 in certain image areas preferably comprises a series of contiguous line segments 138 to replicate stitching. This may not be necessary in narrow marginal image areas such as borders or in areas that are merely accents. However, in all more expansive solid colored image areas 127, each line 137 comprises a series of discrete contiguous line segments 139 traversing the image area. These line segments 139 may vary in length within a range of from 1-12 mm, with a preferred range of between 3.5 to 6.6 mm.

The clearly-visible three-dimensional aspect of the embroidered appliqué design 25 is created by the above-described variations in line orientation, line density, segment length, thickness, and shading, and these characteristics are the essential elements in creating a three dimensional representation of an embroidered emblem or appliqué.

As seen in FIG. 10, the fabric substrate 20 is preferably underplayed by a laminate 30, these two layers being preformed, adhered together (as will be described) and thereby adapted to be heat/pressure laminated to an article of clothing or clothing accessory. Prior to application, the fabric substrate 20 and underlying laminate 30 may be carried on a release layer 40, which may be cellophane or any other suitable translucent or transparent carrier layer that remains stable at elevated heat-seal temperatures.

The laminate 30 is preferably a thermoplastic film laminate (polyurethane, polyolefin, or polyester), but could be powder, liquid, or foam applied versions of thermoplastics, that creates a laminate having a nominal thickness within a range of approximately 2/1000 to 7/1000 of an inch, a unit weight within a range of from 20-35 $gm/m^2$ (and preferably approximately 31 $g/m^2$) and, a glue line (melt) temperature within a range of from 225-350 degrees Fahrenheit (and preferably approximately 307 degrees Fahrenheit), and a softening point temperature below that of the glue line (melt) temperature, within a range of from 190-260 degrees Fahrenheit (and preferably approximately 257 degrees Fahrenheit). One exemplary film laminate is available as Polyurethane film no. 3205 from Bemis Associates Inc., One Bemis Way, Shirley, Mass. 01464. Other Beamis polyurethane films such as nos. 3209, 3218, 3220, 3248, and 3410 are suitable. Alternatively, Nylon (polyamide) and Polyester films such as the Bemis 4000-series and 5000-series films are acceptable. In all such cases, these are environmentally friendly laminates are made without volatile organic compounds (VOC's) such as PVC. Alternatively, a pressure sensitive adhesive can be used depending on the garment type and the wash characteristics required.

It should now be apparent that the foregoing emblems 10 and method for production thereof result in a appliqué emblem bearing a combination of printed elements such as letters, logo graphics, numbers, or other indicia with shading to accentuate the foregoing, all in a form that is easily applied to a garment or other textile so that all of the elements are precisely registered without using direct embroidery.

Having now fully set forth the preferred embodiment and certain modifications of the concepts underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A production process for creating an applique emblem having a three-dimensional embroidered appearance, comprising:

a design phase in which a raster image file of an applique design is digitally created;

a vectorization phase subsequent to said design phase in which the raster image file of said applique design is converted to a vector image;

an interpolation-to-embroidery phase subsequent to said vectorization phase in which pre-defined raster embroidery elements are selected from a library of pre-defined raster embroidery elements, and said selected pre-defined raster embroidery elements are mapped to the vector image; and a raster editing phase subsequent to said interpolation-to-embroidery phase in which characteristics of the raster embroidery elements mapped to the vector image are adjusted to produce a three-dimensional appearance of the applique design, and in which the vector representation having the raster embroidery elements is converted to a raster image file having a resolution of at least 300 dpi.

2. The production process for creating an applique emblem according to claim 1, wherein the pre-defined raster embroidery elements comprise one or more substantially parallel lines having uniform characteristics.

3. A production process for creating an applique emblem having a three-dimensional embroidered appearance, comprising:

a design phase in which a raster image file of an applique design is digitally created;

a vectorization phase in which the raster image file of an applique design is converted to a vector image;

an interpolation-to-embroidery phase in which pre-defined raster embroidery elements are mapped to the vector image, said pre-defined raster embroidery elements comprising one or more substantially parallel lines having uniform characteristics of line thickness, direction, spacing, and shading; and a raster editing phase in which the uniform characteristics of said pre-defined raster embroidery elements are adjusted to produce a three-dimensional appearance of the applique design, and in which the vector representation having the raster embroidery elements is converted to a raster image file having a resolution of at least 300 dpi.

4. The production process for creating an applique emblem according to claim 3, wherein the raster editing phase further comprises manually touching up the characteristics of the raster embroidery elements.

5. The production process for creating an applique emblem according to claim 3, wherein the shading comprises gray-scale shading along one or more of said lines, fading towards the center.

6. The production process for creating an applique emblem according to claim 5, further comprising a print phase in which the design in the raster image file of the converted vector image is transferred to a fabric substrate.

7. The production process for creating an applique emblem according to claim 6, wherein the design in the raster image file is transferred to the fabric substrate by directly printing the image on the fabric substrate using a thermal inkjet printer.

8. The production process for creating an applique emblem according to claim 6, wherein the design in the raster image file is transferred to the fabric substrate by first printing the design on sublimation paper and then thermally transferring the design to the fabric substrate.

9. The production process for creating an applique emblem according to claim 6, further comprising a laminating process in which an adhesive coating is applied to the non-printed surface of the fabric substrate.

10. The production process for creating an applique emblem according to claim 9, wherein the adhesive coating comprises a thermoplastic adhesive or a pressure sensitive adhesive.

11. The production process for creating an applique emblem according to claim 3, further comprising a raster touch-up phase in which the raster image file of the converted vector image is further aesthetically edited using a raster imaging program for a more accurate three-dimensional appearance.

* * * * *